United States Patent [19]
Dixon et al.

[11] Patent Number: 5,287,874
[45] Date of Patent: Feb. 22, 1994

[54] ANTI-USE CAP FOR EXTERIOR WATER FAUCET AND METHOD OF USING

[76] Inventors: Theresa J. Dixon, 720 E. Oakton St., Arlington Hts., Ill. 60004; Michael R. Falls, 1723 Victor Terr., Gurnee, Ill. 60031

[21] Appl. No.: 36,829

[22] Filed: Mar. 25, 1993

[51] Int. Cl.⁵ .......................................... H16K 38/10
[52] U.S. Cl. ..................................... 137/1; 137/382; 137/383
[58] Field of Search ............................ 137/1, 382, 383

[56] References Cited

U.S. PATENT DOCUMENTS

| | | | |
|---|---|---|---|
| 273,862 | 3/1883 | Lyons | 137/382 X |
| 1,174,356 | 3/1916 | Savage | 137/382 |
| 1,311,115 | 7/1919 | Fischer | 137/382 |
| 1,406,060 | 2/1922 | Mueller | 137/382 |
| 1,780,242 | 11/1930 | Replogle | 137/382 X |

*Primary Examiner*—Robert G. Nilson
*Attorney, Agent, or Firm*—Charles F. Lind

[57] ABSTRACT

The disclosed cap has an elongated body with screw threads formed on one end, and an interior cavity extended axially away from the threads toward the other end. The cavity is defined in part by a generally transverse face disposed radially in from the threads and an elongated smaller closed end bore extended axially from the transverse face. The threads and face would be sized to correspond to the threads and transverse face on a packing nut used on an exterior water faucet, and the bore would be sized with sufficient diameter and length to fit with clearance over the faucet stem. The cap would preclude unauthorized use of the faucet by replacing the faucet packing nut with it, which then would overlie the stem and preclude opening or closing actuation of the faucet.

8 Claims, 2 Drawing Sheets

_1_

ANTI-USE CAP FOR EXTERIOR WATER FAUCET AND METHOD OF USING

BACKGROUND OF THE INVENTION

A conventional water faucet has an outlet spigot and valving that can be actuated to open and close the faucut and allow or stop water discharge from the spigot. Most residential buildings, including detached single family and low-rise multiple family buildings, have several exterior water faucets (sometimes referred to as sillcocks) for satisfying outside water needs. However, unauthorized or irresponsibe use of these faucets can create problems.

For example, the owner or operator of a multiple unit building, such as a rental or condominium association, has to pay for the utility cost of water usage in common areas, which would include exterior faucets. An unattended faucet left open for extended durations, possibly even all day or all night, would not only increase the utility costs but could cause local flooding and damage, resulting in needed repairs. In fact, unauthorized exterior faucet usage might routinely cost as much as $5–20 per dwelling unit per month. This wasteful expenditure can create resident resentment and/or hostility and/or divisiveness in determining who individually is at fault and/or should pay.

SUMMARY OF THE INVENTION

This invention relates to apparatus for precluding unauthorized useage of exterior water faucets, and to the method of using the apparatus.

One object of the invention is to provide a cap suited to be connected to the exterior faucet over the faucet stem, to preclude opening or closing actuation of the faucet.

An alternative object of the invention is to provide a cap suited to be connected to the exterior faucet over the outlet spigot, to preclude water discharge from the faucet even should it be opened.

A detailed object of the invention, in connection with the previous objects, is to require the use of a special manual tool and interlock for threadably tightening or loosening the cap relative to the exterior faucet, so that only an authorized person having the tool might remove the cap and use the faucet.

Yet another detailed object of the invention, again in connection with the previous objects, is to provide heat release adhesive on the cooperating threads between the cap and faucet, for precluding tightening or loosening of the cap relative to the exterior faucet once the adhesive has set, other than by torch application of heat thereto, again so that only an authorized person might remove the cap and use the faucet.

BRIEF DISCRIPTION OF THE DRAWINGS

Further objects, advantages and features of the present invention will appear from the following disclosure and description, including as a part thereof the accompanying drawing, in which.

DETAILED DESCRIPTION OF ILLUSTRATED EMBODIMENTS

Figure 1:
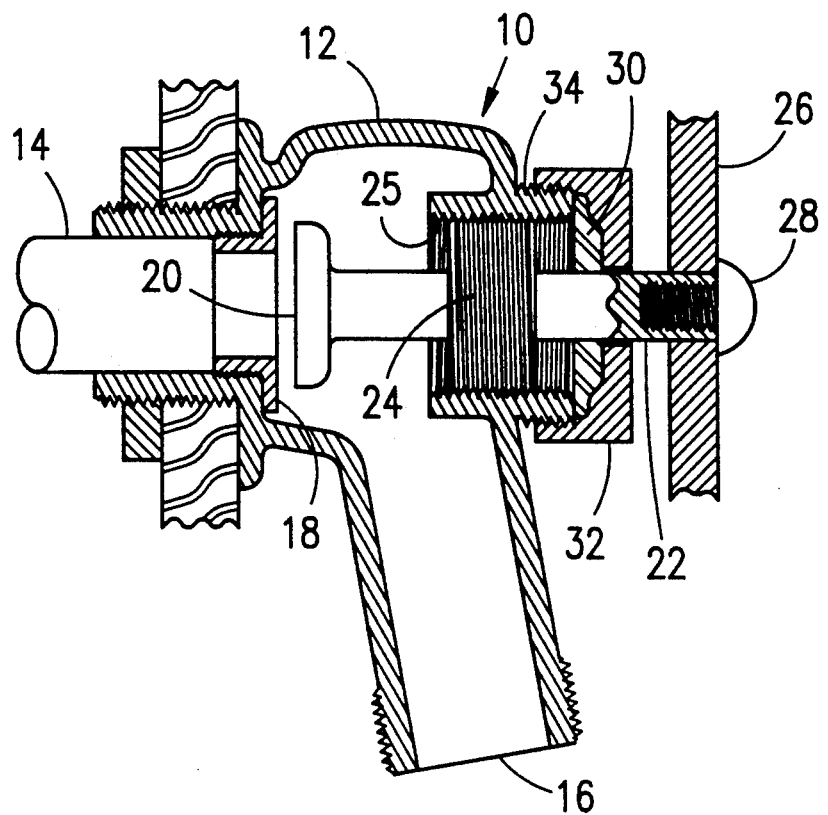
FIG. 1 is a sectional view of a typical exterior faucet, in a normal operative partly open mode.
Figure 5:
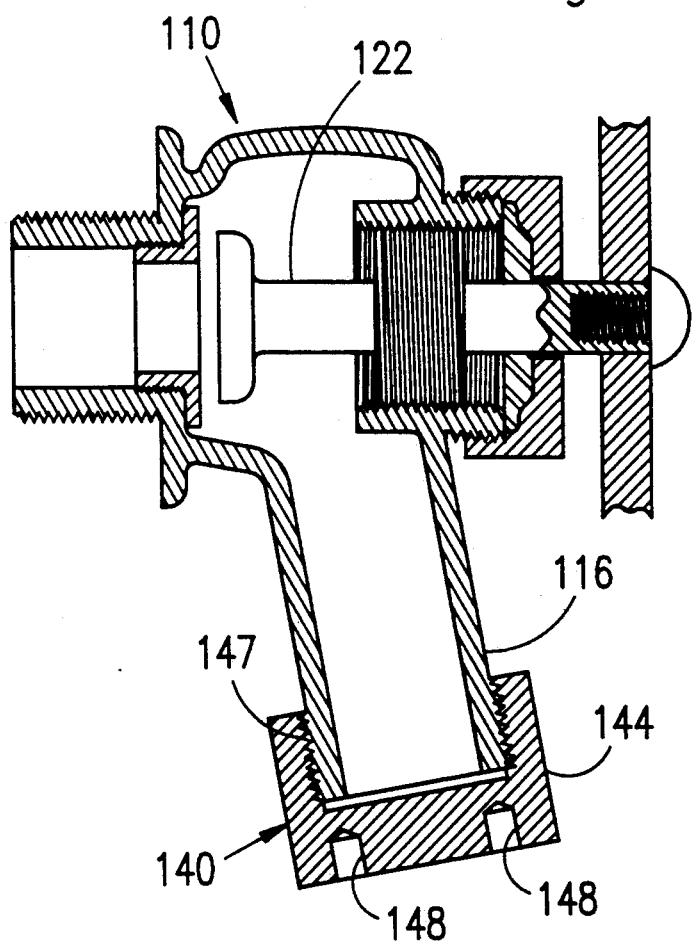
FIG. 5 is a sectional view of the faucet of FIG. 1, except to a reduced scale and further showing the faucet effectively closed in a non use mode with a second embodiment of inventive cap secured in place relative to the faucet.

One type of a conventional exterior faucet 10 is illustrated in FIG. 1, having a hollow body 12 defining a flow passage between an inlet opening sealed to water pipe 14 and outlet spigot 16. Valving associated with the faucet includes an annular valve seat 18 across the flow passage and a seal plug 20 carried on stem 22 to move against the valve seat 18 (FIG. 2) for closing the flow passage or away from the valve seat 18 (FIGS. 1 and 5) for opening the flow passage. The stem 22 has threads 24 thereon adapted to cooperte with valve body threads 25, operable upon stem rotation to move the seal plug 20 between the opened and closed positions. A handle 26 keyed to the stem 22 and held in place by a screw 28 allows manual stem actuation, typically without any tools. Packing 30 prevents water leakage between the stem 22 and housing 12, being held in place by an annular packing nut 32 threaded on housing threads 34, with the stem protruding through and beyond the packing nut.

The particular valving construction of the faucet is not of concern, and can be varied from that illustrated. In practice, inlet pipe 14 will normally be exposed to water contained under pressure, such as from a municipal water system, whereby manual rotation of the handle 26 and stem 22 will open or close the faucet, to allow or stop water discharge from the spigot 16.

The invention to be disclosed provides apparatus and method of precluding effective opening and closing action of the faucet, other than by someone having the needed actuating equipment and/or tool.

Figure 2:
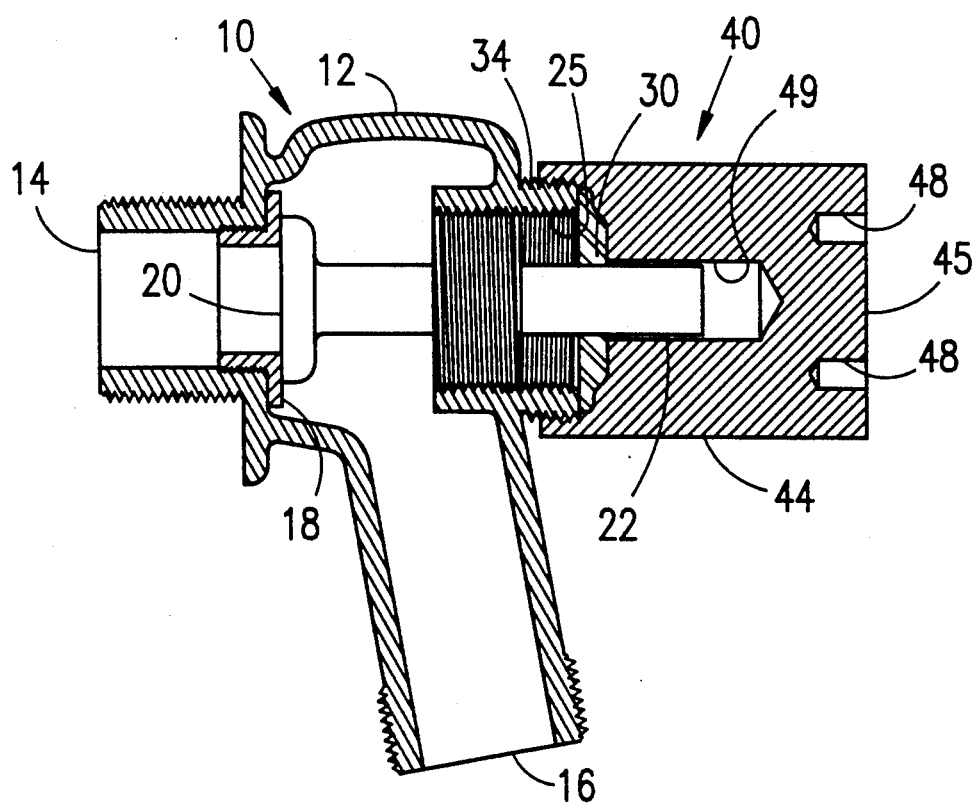
FIG. 2 is a sectional view of part of the faucet of FIG. 1, except shown in a closed mode and made nonoperative with the attachment of one embodiment of the anti-use cap relative to the faucet.
Figure 3:
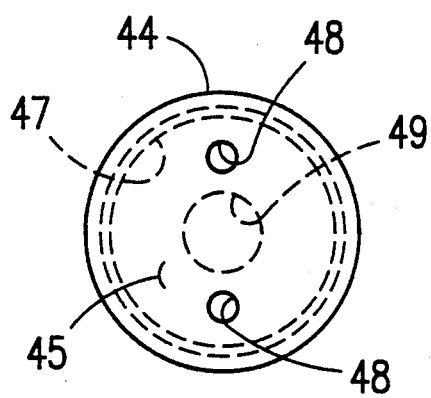
FIG. 3 is an end elevational view of the cap illustrated in FIG. 2.
Figure 4:
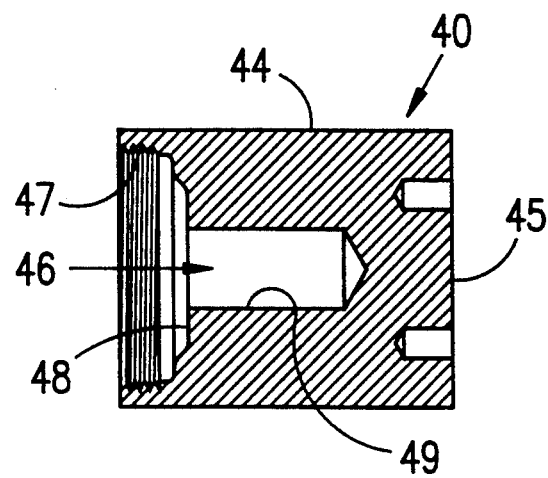
FIG. 4 is a sectional view of only the anti-use cap illustrated in FIG. 3.

Specifically, a cap 40 is illustrated in FIGS. 2, 3 and 4 as having an elongated body with exterior surfaces 44 and 45 and with an interior cavity 46. The cap body adjacent the cavity 46 has threads 47 formed thereon, a broad annular face 48 curved radially in from the threads 47, and an elongated smaller axially extended closed end bore 49 formed off of the transverse face 48. The threads 47 and face 48 would be made the same generally as the threads and corresponding face on the packing nut 32 of the faucet. The bore 49 is sized with sufficient diameter and length to receive with clearance the faucet stem 22.

To use the cap 40, the faucet would first be turned to the closed position (FIG. 2) and the handle 26, locking bolt 28, and packing nut 32 would then be removed from the faucet. As no water pressure will hit the packing 30 at this time, the packing will stay in place. The cap threads 47 would then be lockably tightened onto the packing nut threads 34, whereupon the cap face 48 would close against the packing 30 and the faucet stem 22 would be inaccessable within the cap bore 49. Thus, the positioned cap 40 would preclude rotation of the stem and actuation of the faucet.

A preferred construction provides that the exterior surface 44 is cylindrical and smooth, without any irregularities that can be securely gripped or to which a wrench can be interlocked for turning the cap with any large degree of force. Instead, a pair of axially extended parallel radially spaced openings 48 would be provided to receive the drive pins of a spanner torque tool (not shown) to allow the tool to be keyed to the cap and to selectively tighten or loosen the cap relative to the exterior faucet. While spannner torque tools are conventional, they are not commonly owned, so that only an authorized person would likely have such a tool for removing the cap and using the faucet. Moreover, special tool pin-cap opening contours can be provided, such as by being star shaped, to make the cooperation between the spanner torque tool and cap unique and secure.

In order to establish a sound locked fit between the cap and faucet, it is preferred that a heat release adhesive be applied to the cooperating threads between these components, to preclude the set cap from being loosened relative to or from the exterior faucet once the adhesive has set. Heat release adhesives are generally well known and available, being generally a methacrylic ester that when contained is a fluid as a liquid or paste but that when applied to the threads and exposed to the atmosphere, sets rigidly to hold the threads fast. One version of such an adhesive is marketed under the tradename LOC TITE by Loc Tite Corporation. However, the application of heat to the cooperating components releases the binding effect of the adhesive. Thus, the cap body is formed of a copper alloy, such as brass, to accept heat readily from the exposed flame of a heat torch, to allow quick and easy release of the cap from the faucet. However, the need for a torch to apply the releasing heat again offers an exclusion to faucet usage to only those authorized and provided with the needed tools.

Different types of faucets or sillcocks are available, so that different sizes or even designs of caps would be needed for using the invention on all of such faucets. Specifically, the illustrated packing nut 32 has female threads to cooperate with the male threads 34 on the faucet body 12. However, one nonillustrated faucet has these components reversed, where the female threads are provided on the faucet body and the cooperating male threads thereby are formed on the packing nut. Nonetheless, the inventive cap (not shown) to operate with such a faucet would have the same configuration and sizing as the packing nut specifically used on that faucet body, and would then further provide a body that overlies and covers the faucet stem to preclude its operation.

The invention can be practiced with a simpler version (see FIG. 5), where a cap 140 sized to be threaded onto the spigot 116 can be used, again with a cylindrical and smooth exterior surface 144 having no irregularities that can be securely gripped or to which a wrench can be interlocked and having a pair of axially extended parallel radially spaced openings 148 for receiving the drive pins of a spanner torque tool (not shown) to selectively tighten or loosen the cap relative to the exterior faucet. Again, the cap would be of a heat conducting metal and a heat release adhesive would be applied to the cooperating threads 147 between these faucet and cap components, to preclude the set cap 140 from being loosened relative to or from the exterior faucet once the adhesive has set, other than by heating the cooperating components to release the adhesive. The water faucet stem 122 can be actuated to otherwise open the faucet 110, but with the spicot 116 blocked, unauthorized water usage is prevented.

It can be appreciated that this invention can be used to effectively deactivate a specific water faucet, without the need of turning off the water from the main, so as not to disturb the operation of other faucets. For longer term, the overlying cap 40 is preferred so as to preclude manipulation of the actuating faucet stem.

While only specific embodiments of the invention have been illustrated, it is apparent that variations can be made therefrom without departing from the inventive concept. Accordingly, the invention is to be limited only by the scope of the following claims.

What is claimed as our invention is:

1. For use with an exterior water faucet having a hollow housing and valving operated by a rotatable stem for allowing and stopping water flow to an outlet spigot, packing precluding leakage between the stem and housing and a packing nut cooperating with housing threads for holding the packing in place, and a handle releasably keyed to the stem for allowing manual stem actuation, apparatus for precluding unauthorized faucet useage, comprising the combination of a cap having an elongated body and an axial cavity configured in part the same as the packing nut, with threads to cooperate with the housing packing nut threads and a transverse surface to cooperate with the packing, and with a bore sufficiently large to fit with clearance over the faucet stem but to then cover the stem and preclude access to it;

the cap serving to replace the faucet packing nut and being threadably secured to the housing packing nut threads to overlie the stem and preclude opening or closing actuation of the faucet.

2. The apparatus according to claim 1, further comprising the combination of the cap body having a smooth cylindrical circumferential surface that cannot readily be gripped by hand, and having a flat end surface and axially extended parallel laterally spaced openings provided in the end surface, operable to cooperate with drive pins of a torque spanner tool for tightening or loosening the cap relative to the faucet so that only an authorized person having the tool might remove the cap and use the faucet.

3. The apparatus according to claim 1, further comprising the combination of the cap body being a conductive metal, and of providing heat release adhesive on the cooperating threads between the cap and faucet before tightening the cap to the faucet, for precluding loosening of the cap relative to the faucet once the adhesive has set, other than by torch application of heat thereto, providing that only an authorized person might remove the cap and use the faucet.

4. The apparatus according to claim 1, further comprising the combination of the cap body being a conductive metal and having a smooth cylindrical circumferential surface that cannot readily be gripped by hand and having a flat end surface and axially extended parallel radially spaced openings in the end surface, operable to cooperate with drive pins of a torque spanner tool for tightening or loosening the cap relative to the exterior faucet, and of providing heat release adhesive on the cooperating threads between the cap and faucet before tightening the cap to the faucet, for precluding loosening of the cap relative to the faucet once the adhesive has set, other than by torch application of heat thereto, so that only an authorized person having suitable tools might remove the cap and use the faucet.

5. The apparatus according to claim 4, further comprising the combination of the cap body having said transverse surface contoured the same as the removed packing nut, to cooperate with the packing and hold it in place.

6. A method of precluding unauthorized use of an exterior water faucet having a rotatable stem for controlling water flow from an outlet spigot, packing precluding leakage between the stem and faucet housing and a packing nut cooperating with faucet housing threads for holding the packing in place, and a handle keyed to the stem for allowing manual stem actuation, comprising the steps of turning the stem to the faucet closed position, removing the handle and packing nut from the faucet, and threading a cap to the housing packing nut threads, the cap having an axially elongated body that then overlies and covers the stem and precludes access thereto, operable to prevent opening or closing actuation of the faucet.

7. The method according to claim 6, further including the steps of having the cap body formed of a conductive metal and of providing heat release adhesive on the cooperating threads between the cap and faucet before tightening the cap to the faucet, for precluding loosening of the cap relative to the faucet once the adhesive has set, other than by torch application of heat thereto.

8. The method according to claim 7, further including the steps of providing the cap body with a smooth cylindrical circumferential surface that cannot readily be gripped by hand and a flat end surface and axially extended parallel laterally spaced openings in the end surface, operable to cooperate with drive pins of a torque spanner tool for tightening or loosening the cap relative to the exterior faucet.

* * * * *